United States Patent
Schrinner et al.

(10) Patent No.: US 9,574,078 B2
(45) Date of Patent: Feb. 21, 2017

(54) AQUEOUS POLYACRYLATE COPOLYMER DISPERSIONS WITH HIGH OH GROUP CONTENT

(71) Applicant: Bayer Intellectual Property GmbH, Monheim (DE)

(72) Inventors: Marc Claudius Schrinner, Shanghai (CN); Heinz-Dietmar Gewiss, Meerbusch (DE); Thomas Stingl, Montabaur (DE); Martin Melchiors, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 66 days.

(21) Appl. No.: 14/366,277

(22) PCT Filed: Dec. 20, 2012

(86) PCT No.: PCT/EP2012/076293
§ 371 (c)(1),
(2) Date: Jun. 18, 2014

(87) PCT Pub. No.: WO2013/092807
PCT Pub. Date: Jun. 27, 2013

(65) Prior Publication Data
US 2014/0316051 A1    Oct. 23, 2014

(30) Foreign Application Priority Data
Dec. 22, 2011 (EP) ..................... 11195286

(51) Int. Cl.
| | | |
|---|---|---|
| C08L 33/14 | (2006.01) |
| C08F 283/02 | (2006.01) |
| C09D 151/08 | (2006.01) |
| C09D 175/04 | (2006.01) |
| C08G 18/62 | (2006.01) |
| C08G 18/70 | (2006.01) |
| C08G 18/08 | (2006.01) |
| C08G 18/42 | (2006.01) |
| C09D 133/14 | (2006.01) |

(52) U.S. Cl.
CPC .............. C08L 33/14 (2013.01); C08F 283/02 (2013.01); C08G 18/0823 (2013.01); C08G 18/4277 (2013.01); C08G 18/6254 (2013.01); C08G 18/706 (2013.01); C09D 133/14 (2013.01); C09D 151/08 (2013.01); C09D 175/04 (2013.01)

(58) Field of Classification Search
None
See application file for complete search history.

(56) References Cited

U.S. PATENT DOCUMENTS

| | | |
|---|---|---|
| 5,252,696 A | 10/1993 | Laas et al. |
| 6,399,691 B1 | 6/2002 | Melchiors et al. |
| 6,426,414 B1 | 7/2002 | Laas et al. |
| 2001/0056154 A1 | 12/2001 | Blum et al. |
| 2002/0151638 A1 | 10/2002 | Melchiors et al. |
| 2004/0034162 A1 | 2/2004 | Laas et al. |
| 2004/0034164 A1 | 2/2004 | Melchiors et al. |
| 2006/0205857 A1* | 9/2006 | Hofacker ............. C09D 133/14 524/457 |
| 2007/0282049 A1 | 12/2007 | Munzmay et al. |

FOREIGN PATENT DOCUMENTS

| | | |
|---|---|---|
| DE | 19918132 A1 | 11/2000 |
| DE | 10007821 A1 | 8/2001 |
| DE | 10024624 A1 | 11/2001 |
| DE | 102004054446 A1 | 5/2006 |
| EP | 0540985 A1 | 5/1993 |
| EP | 0947557 A2 | 10/1999 |
| EP | 0959087 A1 | 11/1999 |
| EP | 1024184 A1 | 8/2000 |
| EP | 1862485 A1 | 12/2007 |
| WO | WO-2006134488 A2 | 12/2006 |

OTHER PUBLICATIONS

International Preliminary Report on Patentability and Written Opinion for PCT/EP2012/076293 mailed Jun. 24, 2014.
International Search Report for PCT/EP2012/076293 mailed Feb. 4, 2013.

* cited by examiner

*Primary Examiner* — Ana Woodward
(74) *Attorney, Agent, or Firm* — Drinker Biddle & Reath LLP

(57) ABSTRACT

The present invention relates to aqueous secondary copolymer dispersion comprising a copolymer (P) synthesized from a mixture of free-radically polymerizable monomers (M) comprising: (M1) cycloaliphatic esters of acrylic and/or methylacrylic acid; (M3) hydroxy-functional, free-radically polymerizable monomers; (M4) carboxyl-functional, free-radically polymerizable monomers and (M5) hydroxyl- and carboxyl-free (meth)acrylic esters having C1 to C12 hydrocarbon radicals in the alcohol moiety and/or vinylaromatics, wherein the mixture further comprises polyols (PO) selected from the group of polyester polyols and/or polycarbonate polyols, the polyols having an average hydroxyl group functionality of at least 2. The invention also relates to a method for the production of such a dispersion, to the use of the dispersion as a coating and as a binder in 2K polyurethane coatings.

12 Claims, No Drawings

AQUEOUS POLYACRYLATE COPOLYMER DISPERSIONS WITH HIGH OH GROUP CONTENT

CROSS-REFERENCE TO RELATED APPLICATIONS

This application is a national stage application (under 35 U.S.C. §371) of PCT/EP2012/076293, filed Dec. 20, 2012, which claims benefit of European Application No. 11195286.7, filed Dec. 22, 2011, both of which are incorporated herein by reference in their entirety.

The present invention relates to aqueous secondary copolymer dispersion comprising a copolymer (P) synthesized from a mixture of free-radically polymerizable monomers (M) comprising: (M1) cycloaliphatic esters of acrylic and/or methylacrylic acid; (M3) hydroxy-functional, free-radically polymerizable monomers; (M4) carboxyl-functional, free-radically polymerizable monomers and (M5) hydroxyl- and carboxyl-free (meth)acrylic esters having C1 to C12 hydrocarbon radicals in the alcohol moiety and/or vinylaromatics. The invention also relates to a method for the production of such a dispersion, to the use of the dispersion as a coating and as a binder in 2K polyurethane coatings.

Aqueous secondary copolymer dispersions enjoy widespread use in the art as coating materials and as binders. In this respect, the term "secondary dispersions" refers to those aqueous dispersions which to start with are polymerized in a homogenous organic medium and thereafter are redispersed in an aqueous medium with neutralization, generally without the addition of external emulsifiers.

For example, U.S. 2007/282049 A1 relates to new, aqueous secondary copolymer dispersions, to a process for preparing them and to their use for producing high-grade coatings, especially for wood. The dispersions comprise a copolymer (P) synthesized from a mixture of free-radically polymerizable monomers (M) comprising (M1) cycloaliphatic esters of acrylic and/or methylacrylic acid and also (M2) vinyl esters of aliphatic carboxylic acids.

U.S. Pat. No. 6,399,691 describes a hydroxy-functional copolymer P, which is present as a dispersion and/or solution in water, and is obtained by successively carrying out process steps A-D:A) initially introducing a hydrophobic polymer containing hydroxyl groups into a reaction vessel, B) introducing an initiator component into that vessel, C) subsequently polymerizing a hydrophobic monomer mixture containing hydroxyl groups in that vessel and D) subsequently polymerizing a hydrophilic monomer mixture containing hydroxyl and acid groups in that vessel. The present invention also relates to a process for the preparation of copolymers P following the procedure previously set forth and to coating compositions containing these copolymers P and one or more crosslinking agents.

U.S. 2004/034164 A1 relates to an aqueous binder dispersion that includes at least one copolymer (P) containing carboxylic acid and/or carboxylate groups. The copolymer (P) includes structural units of carboxyl-free (meth)acrylic esters with a cycloaliphatic structure, and at least 25 mol % of the carboxylic acid groups of the copolymer (P) in the dispersion being present in triethanolamine-neutralized form. The aqueous binder can be used in aqueous coating materials, which can be used to coat a substrate.

It would be desirable to improve the hardness of polyacrylate and 2K PUR-PAC coatings without compromising other parameters that are important to the end user. The present invention has the object of providing such polyacrylate dispersions.

According to the invention this object is achieved by an aqueous secondary copolymer dispersion comprising a copolymer (P) synthesized from a mixture of free-radically polymerizable monomers (M) comprising:

(M1) cycloaliphatic esters of acrylic and/or methylacrylic acid (M3) hydroxy-functional, free-radically polymerizable monomers (M4) carboxyl-functional, free-radically polymerizable monomers (M5) hydroxyl- and carboxyl-free (meth)acrylic esters having C1 to C12 hydrocarbon radicals in the alcohol moiety and/or vinylaromatics, wherein the mixture further comprises polyols (PO) selected from the group of polyester polyols and/or polycarbonate polyols, the polyols having an average hydroxyl group functionality of at least 2.

The polyacrylate dispersions according to the invention have high hydroxyl group contents so that, without wishing to be bound by theory, a higher degree of cross-linking and thus higher hardness of coatings may be achieved.

For the purposes of the present invention, acrylic acid or methacrylic acid are also defined as (meth)acrylic acid.

Suitable monomers (M1) are, for example, cyclohexyl (meth)acrylate, cyclohexyl (meth)acrylates ring-substituted with alkyl groups, 4-tert-butylcyclohexyl (meth)acrylate, norbornyl (meth)acrylate, isobornyl (meth)acrylate, preference being given to isobornyl acrylate and/or isobornyl methacrylate, and particular preference to isobornyl methacrylate. It is also possible to use mixtures comprising isobornyl acrylate and isobornyl methacrylate and other monomers (M1). The monomers (M1) other than isobornyl acrylate and isobornyl methacrylate may optionally be used in amounts of less than 10% by weight, based on the sum of (M1) to (M5).

Suitable hydroxyl-functional monomers (M3) include ethylenically unsaturated, hydroxyl-containing monomers, such as hydroxyalkyl esters of unsaturated carboxylic acids, preferably hydroxyalkyl (meth)acrylates having 2 to 12, preferably 2 to 6, carbon atoms in the hydroxyalkyl radical.

Examples of particularly preferred compounds are 2-hydroxyethyl (meth)acrylate, the isomeric hydroxypropyl (meth)acrylates, 2-, 3- and 4-hydroxybutyl (meth)acrylates, and the isomeric hydroxyhexyl (meth)acrylates.

Preferred are 4-hydroxybutyl acrylate (butanediol monoacrylate) and hydroxyethyl methacrylate.

Suitable carboxyl-functional free-radically polymerizable monomers (M4) are olefinically unsaturated monomers containing carboxylic acid or carboxylic anhydride groups, such as acrylic acid, methacrylic acid, beta-carboxyethyl acrylate, crotonic acid, fumaric acid, maleic anhydride, itaconic acid or monoalkyl esters of dibasic acids or anhydrides, such as maleic acid monoalkyl esters, for example. Acrylic acid and/or methacrylic acid are preferred.

Hydroxyl- and carboxyl-free monomers (M5) employed are acrylates and methacrylates having 1 to 18 carbon atoms in the alcohol moiety of the ester group. The alcohol moiety is preferably aliphatic and may be linear or branched.

Examples of suitable monomers of component (M5) are methyl, ethyl, n-propyl, isopropyl, n-butyl, isobutyl, tert.-butyl, the isomeric pentyl, hexyl, 2-ethylhexyl, octyl and dodecyl (meth)acrylates. Particularly suitable vinylaromatics are styrene, optionally substituted styrenes and vinyltoluenes. Preferred monomers (M5) are methyl, n-butyl, isobutyl, tert-butyl (meth)acrylate and also 2-ethylhexyl acrylate and styrene.

Optionally, monomers (M6) such as acetoacetoxyethyl methacrylate, acrylamide, acrylonitrile, vinyl ethers, methacrylonitrile or vinyl acetates may also be present. In addition it is possible to make use, proportionally, of monofunctional polyalkylene oxides having molecular weights of 200 to 3000 g/mol, preferably 350 to 1000 g/mol, or esterified (meth)acrylic acid, which are suitable as nonionic, hydrophilic groups. Suitable alkylene oxides include, preferably, ethylene oxide or mixtures of ethylene oxide and propylene oxide. Preferably, however, the hydrophilicization of the copolymers takes place by ionic groups means monomers (M4).

The proportions of the synthesis components (M1) to (M6) may be chosen such that the copolymer (P) has an OH number (DIN 53240) of 200 to 400 mg KOH/g, preferably of 250 to 300 mg KOH/g solids. With respect to the polyester polyols and/or polycarbonate polyols (PO), it is preferred that the average hydroxyl group functionality is at least 2,5. Suitable polyesterpolyols are the known polycondensates of poly(tri,tetra)ols and di- and also, where appropriate, poly(tri,tetra)-carboxylic acids or hydroxycarboxylic acids or lactones. Instead of the free polycarboxylic acids it is also possible to use the corresponding polycarboxylic anhydride or corresponding polycarboxylic esters of lower alcohols to prepare the polyesters.

Examples of suitable alcohols are trimethylolpropane, glycerol, eythritol, pentaerythritol, trimethylolbenzene or trishydroxyethylisocyanurate.

Examples of suitable dicarboxylic acids include phthalic acid, isophthalic acid, terephthalic acid, tetrahydrophthalic acid, hexahydrophthalic acid, cyclohexane-dicarboxylic acid, adipic acid, azelaic acid, sebacic acid, glutaric acid, tetrachloro-phthalic acid, maleic acid, fumaric acids, itaconic acid, malonic acid, suberic acid, 2-methylsuccinic acid, 3,3-diethylglutaric acid and 2,2-dimethyl-succinic acid. The possible anhydrides of these acids are likewise suitable. For the purposes of the present invention, consequently, the anhydrides are embraced by the expression "acid". It is also possible to use monocarboxylic acids, such as benzoic acid, hexanecarboxylic acid or fatty acids, provided that the average functionality of the polyol is greater than 2. Saturated aliphatic or aromatic acids are preferred, such as adipic acid or isophthalic acid. In smaller amounts it is possible to use polycarboxylic acids such as trimellitic acid. Examples of hydroxycarboxylic acids, which can be used as reactants when preparing a polyesterpolyol having a terminal hydroxyl group, include hydroxycaproic acid, hydroxybutyric acid, hydroxy-decanoic acid or hydroxystearic acid. Examples of suitable lactones include ε-caprolactone or butyrolactone.

The hydroxyl-containing polycarbonates that are suitable are obtainable by reacting carbonic acid derivatives, e.g. diphenyl carbonate, dimethyl carbonate or phosgene, with polyols. Examples include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A but also lactone-modified diols. The diol component preferably contains from 40 to 100% by weight of hexanediol, preferably 1,6-hexanediol and/or hexanediol derivatives, with particular preference to those which in addition to terminal OH groups contain ether groups or ester groups.

In order to obtain the desired functionality of at least 2 the polycarbonate polyols include branching through the incorporation of polyfunctional components, especially low molecular mass polyols. Examples of compounds suitable for this purpose include glycerol, trimethylolpropane, hexane-1,2,6-triol, butane-1,2,4-triol, trimethylolpropane, pentaerythritol, quinitol, marinitol and sorbitol, methyl glycoside or 1,3,4,6-dianhydrohexitols.

The preparation of the copolymer (P) can in principle be carried out by means of conventional free-radical polymerization processes in organic phase. The copolymer (P) is preferably prepared in a multi-stage operation of the kind already described in EP-A 0 947 557 (p. 31.2-p. 41.15) or in EP-A 1 024 184 (P. 21.53-p. 41.9). In this operation first a hydrophobic monomer mixture (M1), free from acid groups or with a low acid group content, is metered in, and then, at a later point in time in the polymerization, a more hydrophilic monomer mixture (MII), containing acid groups, is metered in, the more hydrophilic monomer mixture (MII) containing acid groups containing no monomers of type (M1) and (M2).

The copolymerization is carried out in general at 40 to 180° C., preferably at 80 to 160° C. Suitable initiators (I) for the polymerization reaction include organic peroxides such as di-tert-butyl peroxide, for example, or tert-butyl peroxy-2-ethylhexanoate and azo compounds. The initiator quantities employed depend on the desired molecular weight. For reasons of operational reliability and of greater ease of handling it is also possible to use peroxide initiators in the form of a solution in suitable organic solvents of the type already specified.

The rate of addition of the initiator (I) in the process of the invention may be controlled such that it lasts until the end of the monomer feed (M), and the solvent quantities in steps one and two are chosen so as to result in an organic solvent content of less than 5% by weight.

The amounts of the ingredients are preferably calculated so as to result in a mass ratio (V):(M) of 1:9 to 3:7 and (M1):(MII) of 9:1 to 6:4, with particular preference a mass ratio (V):(M) of 1.2:8.8 to 2:8 and (M1):(MII) of 8.5:11.5 to 7:3.

The free-radical polymerization can be carried out in the presence of a solvent or solvent/water mixture which is charged to the reaction vessel. Suitable organic solvents include any solvents that are known in paint technology, preference being given to those which are typically used as cosolvents in aqueous dispersions, such as alcohols, ethers, alcohols containing ether groups, esters, ketones or nonpolar hydrocarbons, for example, or mixtures of these solvents. The solvents are used in amounts such that their level in the completed dispersion is 0% to 5% by weight, preferably 01% to 5% by weight.

It is further possible to prepare the copolymer by the process of EP-A 1 024 184, using a hydrophobic copolymer as the initial charge.

Instead of a multi-stage polymerization process it is likewise possible to carry out the process of the invention continuously (gradient polymerization), i.e. a monomer mixture is added with a changing composition, the hydrophilic (acid-functional) monomer fractions being higher towards the end of the feed than at the beginning.

The number-average molecular weight Mn of the copolymers (P) can be controlled through a specific choice of the operating parameters, such as of the molar monomer/initiator ratio, for example, of the reaction time or of the temperature, and is situated in general at between 500 g/mol and 30 000 g/mol, preferably between 1000 g/mol and 15 000 g/mol, more preferably between 1500 g/mol and 10 000 g/mol. The hydroxyl group content of the copolymers (P) in 100% form is preferably 1% to 5% by weight, preferably 1.5% to 4.5% by weight and with particular preference 1.75% to 3.5% by weight.

Before, during or after the dispersion of the copolymers (P) in water, the acid groups present are converted at least proportionally into their salt form by addition of suitable neutralizing agents. Suitable neutralizing agents are organic amines or water-soluble inorganic bases, such as soluble metal hydroxides, metal carbonates or metal hydrogen carbonates, for example, such as sodium hydroxide or potassium hydroxide, for example.

Examples of suitable amines are butyldiethanolamine, N-methylmorpholine, triethylamine, ethyldiisopropylamine, N,N-dimethylethanolamine, N,N-dimethyl-isopropanolamine, N-methyldiethanolamine, diethylethanolamine, triethanolamine, butanolamine, morpholine, 2-aminomethyl-2-methylpropanol or isophoronediamine. In mixtures it is also possible, proportionally, to use ammonia. Particularly preferred are triethanolamine, N,N-dimethylethanolamine and ethyldiisopropylamine.

The neutralizing agents are added in amounts such that in total the theoretical degree of neutralization [of the acid groups] is from 40% to 150%, preferably 60% to 120%. The degree of neutralization here is the ratio of added basic groups of the neutralizing component to acid functions of the copolymer. The pH of the aqueous copolymer dispersion of the invention is generally 6 to 10, preferably 6.5 to 9.

The invention will be further described with reference to certain embodiments and other aspects. They may be combined freely unless the context clearly indicates otherwise. Furthermore, the use of the plural in connection with the monomers when describing the present invention does not imply that there needs to be more than one type of monomer under one denomination present.

In one embodiment of the dispersion according to the invention the mixture of free-radically polymerizable monomers (M) does not comprise: (M2) vinyl esters of aliphatic carboxylic acids. Examples for these monomers to be avoided are the esterification products of vinyl alcohol with linear or branched, aliphatic carboxylic acids such as, for example, vinyl acetate, vinyl propionate, vinyl butyrate, vinyl 2-ethylhexanoate, vinyl octanoate, vinyl decanoate, vinyl dodecanoate (vinyl laurate) or vinyl stearate.

In another embodiment of the dispersion according to the invention the copolymer (P) has a hydroxyl group content of ≥5 weight-% to ≤15 weight-%, preferably of ≥7 weight-% to ≤10 weight-%. The hydroxyl group content may be calculated by dividing the hydroxyl number (DIN 53240) by 33.

In another embodiment of the dispersion according to the invention the polyols (PO) have a hydroxyl group content of ≥15 weight-% to ≤35 weight-%, preferably of ≥20 weight-% to ≤30 weight-%. The hydroxyl group content may be calculated by dividing the hydroxyl number (DIN 53240) by 33.

In another embodiment of the dispersion according to the invention the polyols (PO) are polyester polyols obtained from the reaction of an at least trifunctional alcohol with a lactone. A much preferred polyol is obtained from trimethylolpropane and $\epsilon$-caprolactone. For example, trimethylolpropane and $\epsilon$-caprolactone may be reacted in a weight ration of ≥60:40 to ≤80:20, preferably ≥68:32 to ≤72:28. Optionally the reaction may take place in the presence of a catalyst.

In another embodiment of the dispersion according to the invention:
(M1) is isobornyl (meth)acrylate
(M3) is hydroxyethyl (meth)acrylate, hydroxypropyl (meth)acrylate and/or butanediol mono(meth)acrylate
(M4) is (meth)acrylic acid
(M5) is styrene, methyl (meth)acrylate and/or n-butyl (meth)acrylate.

In another embodiment of the dispersion according to the invention the monomers (M1), (M3), (M4) and (M5) are used in the following amounts:
(M1) ≥5 weight-% to ≤25 weight-% (preferably ≥10 weight-% to ≤20 weight-%)
(M3) ≥25 weight-% to ≤45 weight-% (preferably ≥30 weight-% to ≤40 weight-%)
(M4) ≥1 weight-% to ≤10 weight-% (preferably ≥2 weight-% to ≤5 weight-%)
(M5) ≥25 weight-% to ≤45 weight-% (preferably ≥30 weight-% to ≤40 weight-%)
and the polyols (PO) in amounts of ≥5 weight-% to ≤20 weight-% (preferably ≥8 weight-% to ≤15 weight-%),
based on the total weight of the solids in the dispersion, the amounts given adding up to ≤100 weight-%.

The present invention is also directed towards a method for producing a dispersion according to the invention, comprising the step of free-radically polymerizing a mixture of monomers (M) comprising:
(M1) cycloaliphatic esters of acrylic and/or methylacrylic acid
(M3) hydroxy-functional, free-radically polymerizable monomers
(M4) carboxyl-functional, free-radically polymerizable monomers
(M5) hydroxyl- and carboxyl-free (meth)acrylic esters having C1 to C12 hydrocarbon radicals in the alcohol moiety and/or vinylaromatics
wherein the mixture further comprises polyols (PO) selected from the group of polyester polyols and/or polycarbonate polyols, the polyols having an average hydroxyl group functionality of at least 2.

In one embodiment of the method according to the invention the polyols (PO) are polyester polyols obtained from the reaction of an at least trifunctional alcohol with a lactone. A much preferred polyol is obtained from trimethylolpropane and $\epsilon$-caprolactone. For example, trimethylolpropane and $\epsilon$-caprolactone may be reacted in a weight ration of ≥60:40 to ≤80:20, preferably ≥68:32 to ≤72:28. Optionally the reaction may take place in the presence of a catalyst.

In another embodiment of the method according to the invention:
(M1) is isobornyl (meth)acrylate
(M3) is hydroxyethyl (meth)acrylate, hydroxypropyl (meth)acrylate and/or butanediol mono(meth)acrylate
(M4) is (meth)acrylic acid
(M5) is styrene, methyl (meth)acrylate and/or n-butyl (meth)acrylate.

It is preferred that the monomers (M1), (M3), (M4) and (M5) are used in the following amounts:
(M1) ≥5 weight-% to ≤25 weight-% (preferably ≥10 weight-% to ≤20 weight-%)
(M3) ≥25 weight-% to ≤45 weight-% (preferably ≥30 weight-% to ≤40 weight-%)
(M4) ≥1 weight-% to ≤10 weight-% (preferably ≥2 weight-% to ≤5 weight-%)
(M5) ≥25 weight-% to ≤45 weight-% (preferably ≥30 weight-% to ≤40 weight-%)
and the polyols (PO) in amounts of ≥5 weight-% to ≤20 weight-% (preferably ≥8 weight-% to ≤15 weight-%), based on the total weight of the solids in the dispersion, the amounts given adding up to ≤100 weight-%.

Another aspect of the invention is the use of a dispersion according to the invention as a coating material.

The invention is further concerned with the use of a dispersion according to the invention as a binder for aqueous two-component polyurethane coatings in combination with crosslinkers (X). Crosslinkers (X) used are preferably polyisocyanates. Such polyisocyanates have two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI, and may further contain urethane, isocyanurate and/or biuret groups. Optionally the polyisocyanates may also be blocked.

Particular preference is given to the use of low-viscosity polyisocyanates of the abovementioned kind, based on aliphatic or cycloaliphatic isocyanates. Optionally these may also be hydrophilicized.

The polyisocyanates used as crosslinkers generally have a viscosity at 23° C. of 10 to 5000 mPas and may also be employed, if desired in order to adjust viscosity, in a blend with small amounts of inert solvents.

The copolymers of the invention are generally hydrophilic enough that even hydrophobic crosslinker resins can be dispersed without additional emulsifiers. However, this is not to rule out the use of external emulsifiers.

Water-soluble or dispersible polyisocyanates are obtainable for example by modification of carboxylate, sulphonate and/or polyethylene oxide groups and/or polyethylene oxide/polypropylene oxide groups. The polyisocyanates can be made hydrophilic by means for example of reaction with substoichiometric amounts of monohydric, hydrophilic polyether alcohols. The preparation of hydrophilicized polyisocyanates of this kind is described for example in EP-A 0 540 985 (p. 3, l.55 to p. 4, l.5). Also highly suitable are the polyisocyanates containing allophanate groups that are described in EP-A 959 087 (p. 3, l.39 to 51), which are prepared by reacting low-monomer-content polyisocyanates with polyethylene oxide polyether alcohols under allophanatization conditions. Also suitable are the water-dispersible polyisocyanate mixtures described in DE-A 100 078 21 (p. 2, l.66 to p. 31.5), which are based on triisocyanatononane. Of particular suitability and preference are polyisocyanates hydrophilicized with ionic groups, especially sulphonate groups, of the kind described in DE-A 100 24 624 (P. 3 11.13 to 33), for example.

Also possible in principle, of course, is the use of mixtures of different crosslinker resins.

The ratio of the hydroxyl groups of the binder component to the isocyanate groups of the crosslinker (X) is typically 3:1 to 1:5, preferably 2:1 to 1:3 and with particular preference 1:1 to 1:2.

Another aspect of the invention is an aqueous two-component polyurethane coating material comprising a dispersion according to the invention and isocyanate-group containing crosslinkers (X).

Preferably the crosslinkers (X) comprise 1,6-hexamethylene diisocyanate and/or diphenylmethane diisocyanate and/or oligomers or reaction products of hexamethylene diisocyanate and/or diphenylmethane.

The coating materials comprising the aqueous secondary dispersions of the invention can be applied to any desired substrates, examples being wood, metal, plastic, paper, leather, textiles, felt, glass or mineral substrates, and also the substrates which have already been coated. One particularly preferred application is the use of the aqueous coating materials for producing coatings on absorbent substrates such as wood or open-pored, mineral substrates, for example. A preferred substrate is wood.

Likewise provided for the present invention are articles of wood, coated with coating materials comprising the aqueous secondary dispersions of the invention.

The coating materials can be used as they are or in combination with further auxiliaries and adjuvants known from coating technology, such as fillers and pigments, for example.

The coating materials comprising the secondary dispersions of the invention can be applied in known ways, such as by spreading, pouring, knife coating, injecting, spraying, spin coating, rolling or dipping, for example.

The present invention will be described by the following examples without wishing to be limited by them.

GLOSSARY

Dowanol® PnB: Propylene glycol n-butyl ether
Peroxan® DB: Di-tert.-butylperoxide
Bayhydur® XP 2451 Hydrophilic aliphatic polyisocyanate based on HDI
Bayhydur® XP 2655 Hydrophilic aliphatic polyisocyanate based on HDI
Bayhydur® XP 2487/1 Hydrophilic aliphatic polyisocyanate based on HDI
Desmodur® 3900 Low-viscosity, aliphatic polyisocyanate resin based on HDI
Butoxyl® 3-Methoxy-n-butyl acetate
Pendulum hardness tests were performed according to DIN EN ISO 1522, gloss according to ISO 2813/DIN 67530 and haze according to ISO 13803. The solids contents are determined as specified in DIN-EN ISO 3251.

Example 1

A polyester polyol was prepared from 9466 g (70.12 weight-%) trimethylolpropane, 4034 g (29.88 weight-%) ε-caprolactone and 6.75 g (0.05 weight-%) of Desmorapid® Z (dibutyltin dilaurate catalyst). The resulting polyol had a viscosity (23° C., VT 500) of 4524 mPa s (17.93/s), an acid number (DIN 53402) of 0.7 mg KOH/g, an OH number (DIN 53240) of 881 mg KOH/g and an OH content of 26.7 weight-%.

Example 2.1

A polyacrylate copolymer dispersion was prepared using the following components:

|  | Component | Amount [g] |
|---|---|---|
| Part 1 | Polyol of example 1 | 1220 |
|  | Dowanol ® PnB | 605 |
| Part 2 | Peroxan ® DB | 45 |
|  | Dowanol ® PnB | 49 |
| Part 3 | Methyl methacrylate | 1105 |
|  | Hydroxyethyl methacrylate | 2150 |
|  | n-Butyl methacrylate | 510 |
|  | n-Butyl acrylate | 640 |
|  | Isobornyl methacrylate | 1705 |
|  | Butanediol monoacrylate | 718 |
|  | Styrene | 604 |
| Part 4 | Peroxan ® DB | 116 |
|  | Dowanol ® PnB | 123 |

-continued

| | Component | Amount [g] |
|---|---|---|
| Part 5 | Butanediol monoacrylate | 368 |
| | Methyl methacrylate | 416 |
| | Hydroxyethyl methacrylate | 569 |
| | n-Butyl acrylate | 464 |
| | Acrylic acid | |
| Part 6 | Peroxan ® DB | 39 |
| | Dowanol ® PnB | 89 |
| Part 7 | Triethanolamine | 280 |
| | N,N-Dimethylethanolamine | 56 |
| | Total | 6636 |
| Part 8 | Deionized water | 6620 |
| | Total | 12956 |

Example 2.2

A polyacrylate copolymer dispersion was prepared using the following components:

| | Component | Amount [g] |
|---|---|---|
| Part 1 | Polyol of example 1 | 1350 |
| | Dowanol ® PnB | 610 |
| Part 2 | Peroxan ® DB | 38 |
| | Dowanol ® PnB | 45 |
| Part 3 | Methyl methacrylate | 1165 |
| | Hydroxyethyl methacrylate | 2190 |
| | n-Butyl methacrylate | 560 |
| | n-Butyl acrylate | 610 |
| | Isobornyl methacrylate | 1650 |
| | Butanediol monoacrylate | 758 |
| | Styrene | 635 |
| Part 4 | Peroxan ® DB | 98 |
| | Dowanol ® PnB | 103 |
| Part 5 | Butanediol monoacrylate | 338 |
| | Methyl methacrylate | 476 |
| | Hydroxyethyl methacrylate | 536 |
| | n-Butyl acrylate | 435 |
| | Acrylic acid | |
| Part 6 | Peroxan ® DB | 65 |
| | Dowanol ® PnB | 98 |
| Part 7 | Triethanolamine | 230 |
| | N,N-Dimethylethanolamine | 78 |
| | Total | 6636 |
| Part 8 | Deionized water | 6620 |
| | Total | 12956 |

Part 1 was charged to a 30 L reactor with stirrer, reflux condenser, temperature measurement and monomer feed apparatus (dropping funnel) and blanketed with a gentle stream of nitrogen for 1 hour. The batch was then heated to 138° C. with stirring. After the temperature had been reached, part 2 was added over the course of 20 minutes. Immediately thereafter, in parallel, parts 3 and 4 were metered in over 4.5 hours, optionally with cooling. Following complete addition, the batch was held at 138° C. for 0.5 hours. Subsequently parts 5 and 6 were metered in over 1.5 hours. Subsequently the batch was held at 138° C. for an hour, then cooled to 120° C. The pressure was lowered to below 2.5 bar and a sample of 6000 g was taken. Under cooling to 95° C. part 7 was added and the mixture was stirred for 30 minutes. Part 8 was added over the course of 30 minutes to carry out dispersion, followed by stirring at 75° C. for 2 hours.

The sample taken before the addition of part 7 had a solids content of 92.5 weight-%, an OH content (calculated from the OH number according to DIN 53240) of 7.1 weight-% as supplied and 8.4 weight-% in 100% form.

Example 3

Application Testing

Coating formulations were prepared using the following components, the amounts given being weight parts:

| | Comp. 1 | Comp. 2 | 3-1 |
|---|---|---|---|
| Component A | | | |
| Bayhydrol ® XP 2750 | 71.94 | | |
| Bayhydrol ® XP 2695 | | 64.84 | |
| Dispersion of example 2.1 | | | 51.57 |
| BYK ® 349 | 0.15 | 0.15 | 0.15 |
| BYK ® 378 | 0.35 | 0.35 | 0.35 |
| Water | 0.33 | 4.34 | 10.17 |
| Total | 72.77 | 69.68 | 62.24 |
| Component B | | | |
| Bayhydur ® XP 2655 | 19.24 | 23.23 | 27.59 |
| Butoxyl | 7.99 | 7.09 | 10.17 |
| Total | 27.23 | 30.32 | 37.76 |
| Hardener conc. in wt-% | 70.7 | 76.6 | 73.1 |
| Co-solvent in wt.-% | 8.0 | 12.0 | 12.0 |
| NCO/OH ratio | 1.5 | 1.5 | 1.5 |
| Solids content | 50.0% | 50.0% | 50.0% |
| Mixing ratio A/B | 2.67 | 2.30 | 1.65 |

The coatings were applied at 23° C. and a relative humidity of 45% using a 1.4 mm nozzle and subjected to the following tests:

| | Comp. 1 | Comp. 2 | 3-1 |
|---|---|---|---|
| Coil coat | | | |
| Film thickness in μm | 42 | 48 | 68 |
| Gloss 20°/haze | 80/90 | 87/14 | 87/12 |
| Glass | | | |
| Pendulum hardness 7 d RT | 64 | 124 | 145 |
| Pendulum hardness 14 d RT | 80 | 145 | 161 |

Furthermore, UV-Blight exposition showed a good performance after 1000 hours of the coating according to the invention when compared to comparative examples 1 and 2.

Example 4

Application Testing

Coating formulations were prepared using the dispersion of example 2.1 and various polyisocyanates. After drying the resulting films were treated with 30% $H_2SO_4$ and the chemical resistance was tested:

| Polyisocyanate | Drying conditions | 24 h | 48 h |
|---|---|---|---|
| Bayhydrol ® XP 2451 | Room temp. | 3/2 | 2/0 |
| Bayhydrol ® XP 2451 | 60° C., ageing | 4/2 | 4/2 |
| Bayhydrol ® XP 2655 | Room temp. | 5/2 | 3/2 |
| Bayhydrol ® XP 2655 | 60° C., ageing | 5/2 | 5/2 |
| Desmodur ® N 3900 | Room temp. | 4/2 | 2/2 |
| Desmodur ® N 3900 | 60° C., ageing | 4/2 | 4/2 |

Grading Scheme:
First grade: film appearance after removal of cotton swab and cleaning. 5=no visible changes; 4=slight gloss or color changes; 3=readily visible color changes, matte; 2=strong color changes, slight surface changes (swelling); 1=the surface has changed or the surface material is partially destroyed or the cotton sticks to the surface; 0=film destroyed (can be wiped away).

Second grade: film appearance after scratching with finger nail. 2=no visible change; 1=scratchable; 0=completely scratchable.

The invention claimed is:

1. An aqueous copolymer dispersion comprising a copolymer (P) synthesized from a mixture of free-radically polymerizable monomers (M) comprising:
   (M1) a cycloaliphatic ester of acrylic and/or methylacrylic acid,
   (M3) a hydroxy-functional, free-radically polymerizable monomer,
   (M4) a carboxyl-functional, free-radically polymerizable monomer,
   (M5) a hydroxyl- and carboxyl-free (meth)acrylic ester having C1 to C12 hydrocarbon radicals in the alcohol moiety different from (M1) and/or a vinyl aromatic monomer,
   wherein the mixture further comprises a polyol different from (M3) selected from the group of polyester polyol, polycarbonate polyol, and mixtures thereof, wherein the polyol has an average hydroxyl group functionality of at least 2, and wherein the polyol has a hydroxyl group content of ≥15 weight-% to ≤35 weight-%.

2. The dispersion according to claim 1, wherein the mixture of free-radically polymerizable monomers (M) does not comprise:
   (M2) vinyl esters of aliphatic carboxylic acids.

3. The dispersion according to claim 1, wherein the copolymer (P) has a hydroxyl group content of ≥5 weight-% to ≤15 weight-%.

4. The dispersion according to claim 1, wherein the polyol is a polyester polyol obtained from the reaction of an at least trifunctional alcohol with a lactone.

5. The dispersion according to claim 4, wherein the polyester polyol is obtained from trimethylolpropane and ε-caprolactone.

6. The dispersion according to claim 1, wherein the aqueous dispersion further comprises a compound comprising an element of sub-groups 5 and/or 6 of the periodic table.

7. The dispersion according to claim 1, wherein:
   (M1) is isobornyl (meth)acrylate,
   (M3) is hydroxyethyl (meth)acrylate, hydroxypropyl (meth)acrylate and/or butanediol mono(meth)acrylate,
   (M4) is (meth)acrylic acid,
   (M5) is styrene, methyl (meth)acrylate and/or n-butyl (meth)acrylate.

8. The dispersion according to claim 1, wherein the monomers (M1), (M3), (M4) and (M5) are used in the following amounts:
   (M1) ≥5 weight-% to ≤25 weight-%,
   (M3) ≥25 weight-% to ≤45 weight-%,
   (M4) ≥1 weight-% to ≤10 weight-%,
   (M5) ≥25 weight-% to ≤45 weight-%,
   and the polyols (PO) in amounts of ≥5 weight-% to ≤20 weight-%,
   based on the total weight of the solids in the dispersion, the amounts given adding up to ≤100 weight-%.

9. A method for producing a dispersion according to claim 1, comprising the step of free-radically polymerizing a mixture of monomers (M) comprising:
   (M1) cycloaliphatic ester of acrylic and/or methylacrylic acid,
   (M3) hydroxy-functional, free-radically polymerizable monomer,
   (M4) carboxyl-functional, free-radically polymerizable monomer,
   (M5) hydroxyl- and carboxyl-free (meth)acrylic ester having C1 to C12 hydrocarbon radicals in the alcohol moiety different from (M1) and/or a vinyl aromatic monomer,
   wherein the mixture further comprises a polyol different from (M3) selected from the group of polyester polyol, polycarbonate polyol, and mixtures thereof, wherein the polyol has an average hydroxyl group functionality of at least 2.

10. The method according to claim 9, wherein the polyol is polyester polyol obtained from the reaction of an at least trifunctional alcohol with a lactone.

11. The method according to claim 9, wherein:
    (M1) is isobornyl (meth)acrylate,
    (M3) is hydroxyethyl (meth)acrylate, hydroxypropyl (meth)acrylate and/or butanediol mono(meth)acrylate,
    (M4) is (meth)acrylic acid, and
    (M5) is styrene, methyl (meth)acrylate and/or n-butyl (meth)acrylate.

12. A method comprising utilizing the dispersion according to claim 1 as a coating material.

* * * * *